US009649810B2

(12) United States Patent
Thaerigen

(10) Patent No.: US 9,649,810 B2
(45) Date of Patent: May 16, 2017

(54) HORIZONTAL TRANSVERSE SEALING STATION

(71) Applicant: Robert Bosch GmbH, Stuttgart (DE)

(72) Inventor: Jan Thaerigen, Löhingen (CH)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/915,980

(22) PCT Filed: Sep. 2, 2014

(86) PCT No.: PCT/EP2014/068570
§ 371 (c)(1),
(2) Date: Mar. 2, 2016

(87) PCT Pub. No.: WO2015/032735
PCT Pub. Date: Mar. 12, 2015

(65) Prior Publication Data
US 2016/0193783 A1    Jul. 7, 2016

(30) Foreign Application Priority Data
Sep. 3, 2013    (DE) .......................... 10 2013 217 548

(51) Int. Cl.
*B32B 37/00*    (2006.01)
*B29C 65/00*    (2006.01)
(Continued)

(52) U.S. Cl.
CPC ............ *B29C 66/849* (2013.01); *B29C 65/08* (2013.01); *B29C 65/18* (2013.01);
(Continued)

(58) Field of Classification Search
CPC ... B29C 66/849; B29C 65/18; B29C 66/1122; B29C 66/4312; B29C 66/4322; B65B 9/067; B65B 51/306
(Continued)

(56) References Cited

U.S. PATENT DOCUMENTS 3,438,173 A    4/1969 Omori
5,451,288 A *  9/1995 Smith ...................... B26D 7/10
                                                      156/359

(Continued)

FOREIGN PATENT DOCUMENTS

DE        60003385       7/2004
DE     102006022193     11/2007
(Continued)

OTHER PUBLICATIONS

International Search Report for Application No. PCT/EP2014/068570 dated Nov. 18, 2014 (English Translation, 2 pages).

*Primary Examiner* — James Sells
(74) *Attorney, Agent, or Firm* — Michael Best & Friedrich LLP

(57) ABSTRACT

The invention relates to a horizontal transverse sealing station (10a-b), in particular for a horizontal tubular bag machine (12a-b), for producing transverse sealing seams (14a-b) on at least one film tube (18a-b) transported in a continuous, at least essentially horizontal transport direction (16a-b), comprising a transverse sealing station base (20a-b) fixedly connected to a packing machine (22a-b), a transverse sealing unit (24a-b), and at least one sealing jaw pair (28a-b) movably mounted on the transverse sealing unit (24a-b) and formed by two sealing jaws (26a-b), the sealing surfaces (30a-b) of which come closer to each other during a sealing process in a sealing movement (32a-b), which relative to the transverse sealing unit (24a-b) is provided with at least one movement component (34a-b) in the transport direction (16a-b), in order to seal material layers (36a-b) of the film tube (18a-b) between the sealing surfaces (30a-b) by way of heating and/or applying pressure, and to remove again at the end of the sealing process. According to the invention the transverse sealing unit (24a-b) is driveably mounted on the (Continued)

transverse sealing station base (20a-b) in a displacement movement (38a-b) that is at least substantially parallel to the transport direction (16a-b).

9 Claims, 3 Drawing Sheets

(51) Int. Cl.
*B29C 65/08* (2006.01)
*B29C 65/18* (2006.01)
*B29C 65/48* (2006.01)
*B29C 65/78* (2006.01)
*B65B 51/30* (2006.01)
*B65B 9/067* (2012.01)
*B29C 65/30* (2006.01)
*B29L 23/00* (2006.01)
*B29L 31/00* (2006.01)

(52) U.S. Cl.
CPC ...... *B29C 65/4825* (2013.01); *B29C 65/7894* (2013.01); *B29C 66/1122* (2013.01); *B29C 66/133* (2013.01); *B29C 66/4312* (2013.01); *B29C 66/4322* (2013.01); *B29C 66/81465* (2013.01); *B29C 66/83513* (2013.01); *B29C 66/83543* (2013.01); *B65B 9/067* (2013.01); *B65B 51/306* (2013.01); *B29C 65/087* (2013.01); *B29C 65/305* (2013.01); *B29C 66/723* (2013.01); *B29C 66/83413* (2013.01); *B29C 66/86533* (2013.01); *B29L 2023/00* (2013.01); *B29L 2031/7128* (2013.01)

(58) Field of Classification Search
USPC ................................... 156/580, 581, 583.1
See application file for complete search history.

(56) References Cited

U.S. PATENT DOCUMENTS

| | | | |
|---|---|---|---|
| 6,662,527 B1 | 12/2003 | Suga | |
| 6,736,182 B2* | 5/2004 | Smith | B29C 65/18 156/251 |
| 7,730,698 B1 | 6/2010 | Montano et al. | |
| 7,941,991 B2* | 5/2011 | Montano | B29C 65/18 100/328 |
| 8,087,220 B2 | 1/2012 | Uttaro et al. | |
| 2002/0020153 A1 | 2/2002 | Klinkel | |
| 2009/0260333 A1 | 10/2009 | Kammler et al. | |

FOREIGN PATENT DOCUMENTS

| | | |
|---|---|---|
| EP | 1167190 | 1/2002 |
| EP | 1533106 | 5/2005 |
| JP | 2006027671 | 2/2006 |
| WO | 2009023894 | 2/2009 |

* cited by examiner

HORIZONTAL TRANSVERSE SEALING STATION

BACKGROUND OF THE INVENTION

A horizontal transverse sealing station for a horizontal tubular bag machine, for producing transverse sealing seams on at least one film tube transported in a continuous, at least substantially horizontal transport direction, comprising a transverse sealing station base, which is fixedly connected to the tubular bag machine, comprising a transverse sealing unit, and comprising at least one sealing jaw pair, which is movably mounted on the transverse sealing unit and is formed by two sealing jaws and the sealing surfaces of which, during a sealing process, come closer together in a sealing movement having relative to the transverse sealing unit at least one movement component in the transport direction, in order to seal material layers of the film tube between the sealing surfaces, under the application of heat and/or pressure, and to move said material surfaces apart again at the end of the sealing process, has already been proposed.

SUMMARY OF THE INVENTION

The invention is based on a horizontal transverse sealing machine, in particular for a horizontal tubular bag machine, for producing transverse sealing seams on at least one film tube transported in a continuous, at least substantially horizontal transport direction, comprising a transverse sealing station base, which is fixedly connected to a packaging machine, comprising a transverse sealing unit, and comprising at least one sealing jaw pair, which is movably mounted on the transverse sealing unit and is formed by two sealing jaws and the sealing surfaces of which, during a sealing process, come closer together in a sealing movement having relative to the transverse sealing unit at least one movement component in the transport direction, in order to seal material layers of the film tube between the sealing surfaces, under the application of heat and/or pressure, and to move said material surfaces apart again at the end of the sealing process.

It is proposed that the transverse sealing unit is mounted drivably on the transverse sealing station base with a displacement movement at least substantially parallel to the transport direction. By a "horizontal tubular bag machine" should in this context be understood, in particular, a packaging machine which is known to a person skilled in the art as an HFFS "Horizontal Form Fill Seal" packaging machine, which is designed to form from a material web at least one film tube around one or more products to be packed and to seal this at both ends. Products to be packed and the film tube formed around the products are moved during the forming of the tube, the introduction into the film tube of the products to be packed, and the sealing of the tube, at least substantially in a horizontal transport direction. By "at least substantially horizontal" should in this context be understood, in particular, a direction which varies by less than 60°, preferably less than 45°, particularly preferably less than 20°, from a horizontal arranged perpendicular to a weight force. By "continuous" should in this context be understood, in particular, that changes in velocity of the transport movement occur constantly. In particular, the sealing process should take place during the continuous, stoppage-free transport movement. Preferably, products to be packed rest during a feed movement on a feed tray. The material web is preferably formed into a film tube around the products to be packed. The film tube is preferably sealed by a longitudinal sealing unit, which, in the transport direction, is arranged before the transverse sealing unit. For the formation of the tube, the longitudinal sealing unit connects the two outer edges of the material web, which are arranged parallel to the transport direction of the material web, preferably with a fin seam, wherein the inner sides of the material web edges are placed one upon another and joined. Preferably, the longitudinal sealing unit connects two material layers of the material web. By a "material layer" should in this context be understood, in particular, a layer of the material web, wherein a material layer can have a plurality of bands, such as, in particular, a substrate band and a sealing band. The longitudinal sealing unit preferably contains one or more sealing devices, for example sealing roller pairs and/or sealing jaws, which connect the outer edges one to another, under the application of heat and/or pressure to the material web layers. Products to be packed are preferably inserted into the film tube by suitable means, such as a feed chain having dogs which push the product in the transport direction. By a "transverse sealing unit" should in this context be understood, in particular, a unit which is designed to seal the film tube, in the transport direction, in front of and behind products to be packed. It is also possible for a plurality of film tubes to be formed, out of one or more material webs, alongside one another in the transport direction. This is in particular the case in multilane horizontal tubular bag machines, in which products to be packed are fed on a plurality of lanes arranged alongside one another in the transport direction. The horizontal tubular bag machine can in this case form for each lane a film tube around products to be packed and seal this along the transport direction with longitudinal sealing units. The film tubes can be transported side by side through the transverse sealing unit. The transverse sealing unit seals the film tubes in front of and behind the products to be packed, preferably in a common sealing process. The transverse sealing unit seals the film tube preferably with transverse sealing seams, which are arranged at least substantially transversely to the transport direction. By "transversely" should in this context be understood, in particular, a direction which varies from a perpendicular to the packaging direction and the weight force by less than 45°, preferably less than 20°, particularly preferably less than 10°. Preferably, the sealing seam is arranged at least substantially horizontally. Particularly preferably, the horizontal transverse sealing unit, in a sealing process, simultaneously seals a (in the transport direction) rear end of one pack and a (in the transport direction) front end of a following pack. Particularly preferably, the horizontal transverse sealing unit separates in the same work step the film tubes forming the packs, and thus the successive packs. The transverse sealing unit seals the film tube in that sealing surfaces of the sealing jaws of a sealing jaw pair press together the material layers of mutually opposite sides of the film tube. By a "sealing jaw pair" should in this context be understood two sealing jaws between whose sealing surfaces the film tube is sealed. The transverse sealing unit can have a plurality of sealing jaw pairs. Preferably, a first sealing jaw of the sealing jaw pair contains a crushing blade and a second sealing jaw of the sealing jaw pair contains a brace. The film tube can be cut through between the crushing blade and the brace. The material layers can preferably have sealing bands, which promote a joining of the material layers. The sealing bands can in particular have a coating which, in particular through pressure, forms a connection with the further sealing band, such as a contact adhesive. The sealing jaws can be heated and deliver, apart from pressure, heat to the material layers. The sealing bands can have a coating which, in particular during a heating process, melts at a lower temperature than an outer side of the material web and forms a connection with the further sealing band, in particular a polymer having a lower melting temperature than the outer side and/or substrate band of the material web. The sealing bands can fuse and in this way bond. A melting of the outer side of the material web upon contact with the sealing jaws can be avoided. The person skilled in the art knows of further methods which promote sealing of the material layers, such as, in particular, the subjection of the sealing jaws to high-frequency oscillations in ultrasonic sealing. The sealing jaws can relay the high-frequency oscillations in the form of pressure oscillations to the material layers, so that the material layers deform and heat is generated due to internal damping. By a "sealing movement" should be understood a motional sequence of a sealing jaw pair, in which the sealing jaws come closer together, produce a sealing seam and move apart again. The sealing movement can be a cyclical movement between two end points. Preferably, the sealing movement is a circuitous movement along a closed path, such as, in particular, a circular path or a D-shaped path. Further advantageous sealing movements are known to the person skilled in the art. By a sealing movement having a "movement component in the transport direction" should in this context be understood, in particular, that the sealing movement, at least while the sealing surfaces are touching the material layers of the film tube, in order to produce a sealing, has relative to the transverse sealing unit a movement component in the transport direction of the film tube. By a "displacement movement at least substantially parallel to the transport direction" should in this context be understood, in particular, a movement along a direction which varies by less than 10°, preferably less than 5°, particularly preferably less than 1°, from the transport direction of the film tube in the region of the transverse sealing unit. The displacement movement can advantageously compensate a velocity difference between the film tube and the sealing surfaces of the sealing jaw pair in the transport direction. In particular, the sealing surfaces can be moved during the sealing process, in relation to the transverse sealing unit in the transport direction, at a lower velocity than the film tube. The velocity difference can be compensated by the displacement movement. A movement of the sealing surfaces which results from the sealing movement and the displacement movement can be synchronous, in the transport direction, with the transport movement of the film tube. The sealing surfaces can heat the material layers and/or apply pressure to the material layers over a particularly long period. The quality of the transverse sealing seams can be particularly high. In particular, a sealing period can be independent of a film velocity in the transport direction. The velocity difference between sealing surfaces and film tube in the transport direction can be compensated by the displacement movement. The movement of the sealing surfaces in the direction of the film tube can be generated independently of the mounting of the sealing jaws on the transverse sealing unit. Tolerances of the displacement movement have no influence on the relative position of the sealing jaws of a sealing jaw pair one to the other. A sealing pressure between the sealing surfaces of a sealing jaw pair can be at least broadly uninfluenced by tolerances of the displacement movement.

In addition, a drive and/or control unit, which is designed to drive the transverse sealing unit in the displacement movement during the sealing process such that a velocity difference of the sealing movement and of the film tube in the transport direction is at least substantially compensated, is proposed. By a "drive and/or control unit" should be understood, in particular, a unit which is designed to trigger and/or to influence the displacement movement. The drive and/or control unit can have drives, such as gear and/or crank mechanisms, motors, in particular electric motors, as well as mechanical and/or electrical control devices. By a "compensation of a velocity difference of the sealing movement and the film tube in the transport direction" should in this context be understood, in particular, that the displacement movement is chosen such that the sealing surfaces and the film tube, at least while they are touching one another, have in the transport direction, at least substantially, a matching velocity. By "at least substantially" should be understood, in this context, a variance of less than 10%, preferably less than 5%, particularly preferably less than 1%. During the sealing process, the sealing surfaces can follow the film tube particularly well. A relative velocity between film tube and sealing surfaces can be avoided. A compression of the film tube and/or pulling on the film tube between the sealing surfaces can be avoided. Preferably, the drive and/or control unit can be designed to move the transverse sealing unit between two sealing processes counter to the transport direction back into a starting position and, for a next sealing process, to resynchronize the sealing surfaces with the film tube in the transport direction. The sealing surfaces can be moved, in a succession of sealing processes, synchronously with the film tube. Preferably, the velocity of the sealing movement of the sealing jaws during the sealing process can be set such that a desired sealing time is achieved. The sealing time can be defined, for example, by properties of the material of the film tube and/or requirements relating to the quality of the transverse sealing seams. Preferably, the displacement movement can compensate the remaining velocity difference between sealing movement and transport movement of the film tube. The sealing time can be set broadly independently of the velocity of the transport movement of the film tube. With a given sealing time, higher velocities of the film tube can be achieved. Limiting factors with respect to the setting of the sealing time can be, in particular, a possible deflection, acceleration and/or velocity of the displacement movement.

Preferably, the horizontal transverse sealing station has a mass compensating unit comprising at least one drivably mounted compensating mass, which, in a compensation movement comprising at least one movement component parallel to the displacement movement, is driven such that the inertial forces induced by the displacement movement and those induced by the compensation movement are at least partially eliminated. By "at least partially eliminated" should in this context be understood, in particular, that a resultant of the inertial forces in the direction of the displacement movement is less than 50%, preferably less than 25%, particularly less than 10%, of the inertial forces induced by the displacement movement of the transverse sealing unit in the displacement direction. Preferably, the compensation movement can be a linear movement opposite to the displacement movement. Ideally, a plurality of compensating masses are arranged such that the virtual center of mass of the compensating masses and the virtual center of mass of the transverse sealing unit are in line along the displacement direction. By a "virtual center of mass" of the transverse sealing unit and of the compensating mass respectively should in this context be understood the common center point of all masses which form the transverse sealing unit and the compensating mass respectively. Preferably, a distance between the virtual center of mass of the compensating mass and a linear guide displaceably supporting the transverse sealing unit on the transverse sealing station base, in the direction of the weight force, is equal to or less than a distance, in the direction of the weight force, between the virtual center of mass of the transverse sealing unit and the linear guide. Preferably, the virtual centers of mass of the transverse sealing unit and the compensating mass are aligned in the transport direction. By "are aligned" should in this context be understood, in particular, that the virtual centers of mass move substantially in a plane which is spanned by the transport direction and the direction of the weight force. Resulting inertial forces of the compensation movement and of the displacement movement can remain small. Complexity of design can be reduced in relation to an ideal full compensation of the inertial forces. Vibrations can be reduced. The displacement movement can be executed at particularly high velocities. Transport velocities of the film tube can be particularly high. The horizontal transverse sealing station can be particularly efficient.

In addition, an energy storage unit, which is designed to apply a restoring force, opposite to a deflection of the displacement movement, to the transverse sealing unit, is proposed. The energy storage unit can have, in particular, at least one spring element. Preferably, the energy storage unit applies the restoring force between the transverse sealing unit and the transverse sealing station base, particularly preferably between the transverse sealing unit and the mass compensating unit. If the restoring force is applied between the transverse sealing unit and the mass compensating unit, influences of the restoring force upon the transverse sealing station base and/or the packaging machine are avoided. Vibrations can be reduced. By a "deflection" should in this context be understood a path of the displacement movement starting from a neutral position in which the energy storage unit applies no restoring force to the transverse sealing unit. Preferably, upon a displacement of the transverse sealing unit, the energy storage unit produces in the course of the displacement movement, on both sides of the neutral position, a restoring force in the direction of the neutral position. Preferably, the restoring force has its maxima at turning points of the displacement movement. Drive forces for the displacement movement can be lowered and/or become more even. At the turning point, a particularly high acceleration of the displacement movement can be achieved.

In addition, a supporting unit, which is designed to support the film tube in a sealing region of the transverse sealing unit, before and/or after the sealing process, against a weight force is proposed. By a "sealing region" should in this context be understood a region of the transverse sealing unit which is swept by the sealing surfaces of the sealing jaw pair while these are touching the film tube. The supporting unit can be arranged on both sides of the at least one sealing jaw disposed below the film tube in the direction of the weight force. It is also possible for the supporting unit to be mounted on other components of the horizontal transverse sealing station or packaging machine and to be moved synchronously with the transverse sealing unit. A sinking and/or sagging of the film tube in the direction of the weight force in front of and/or behind the sealing region can be avoided.

It is further proposed that the horizontal transverse sealing station has a crank mechanism, which is designed to generate the displacement movement from a rotary drive movement of a displacement drive. Preferably, the crank mechanism is part of the drive and control unit which is designed to drive the displacement movement. By a "crank mechanism" should in this context be understood, in particular, a gear mechanism which, for the transmission of movement, has at least one crank. The crank mechanism can advantageously translate the rotary drive movement into a cyclical, linear displacement movement. A rotary drive movement can have particularly low, cyclical inertial forces. Vibrations can be avoided. A reversal of the drive movement of the displacement drive at turning points of the displacement drive can be avoided. In an alternative embodiment of the invention, it is proposed that the drive and/or control unit has a crank mechanism which is designed to generate the displacement movement from a drive movement of a sealing drive of the transverse sealing unit. By a "sealing drive of the transverse sealing unit" should in this context be understood, in particular, a drive which is designed to drive the sealing movement. Preferably, the drive movement can be a circuitous, rotary drive movement. A separate drive for the displacement movement can be dispensed with. It can particularly easily be ensured that the sealing movement and the displacement movement are synchronous. Preferably, the crank mechanism has at least one adjusting device, which is designed to adjust a translation profile between the rotary drive movement and the displacement movement. A relationship between sealing movement and displacement movement can be advantageously influenced.

In a further embodiment of the invention, it is proposed that the horizontal transverse sealing station has a linear drive, which is designed to generate the displacement movement. Preferably, the linear drive is part of the drive and control unit designed to drive the displacement movement. Preferably, a linear motor moves parallelly in counter direction to the displacement movement. Preferably, a lever gear mechanism is provided to transmit the movement of the linear motor, in counter direction, to the transverse sealing unit. Preferably, a transmission ratio of the movement of the linear motor and the transverse sealing unit is chosen such that it corresponds to a reciprocal of the ratio of the respective masses of the linear motor and of the transverse sealing unit relative to each other. Inertial forces of the linear motor and of the transverse sealing unit can be at least partially eliminated. The linear motor can form a mass compensating unit and/or be part of a mass compensating unit. The displacement movement can be adjusted independently of sealing movement. Mechanical readjustments can be dispensed with. A velocity profile of the displacement movement can be adjusted in a particularly flexible manner.

It is proposed that the sealing jaws are mounted on sealing shafts mounted rotatably on the transverse sealing unit. Preferably, two sealing shafts are arranged, in the direction of the weight force, above and below the film tube and respectively support a sealing jaw of a sealing jaw pair or a plurality of sealing jaws of a plurality of sealing jaw pairs. Preferably, the sealing surfaces of the sealing jaws are driven along circular paths, wherein sealing axes of the sealing shafts form centers of the circular paths. The transverse sealing unit can be particularly inexpensive. The sealing jaws can be rotatingly driven at a particularly high velocity. It is possible, in particular for the manufacture of short packs having transverse sealing seams which follow one upon the other at short intervals, for a plurality of sealing jaws of a plurality of sealing jaw pairs to be arranged on the sealing shafts, in particular two to six sealing jaws of two to six sealing jaw pairs. The sealing shafts can rotate at a lower velocity. Preferably, the rotation velocity of the sealing jaws during the contact of the sealing jaws of the jaws with the film tube can be reduced such that the tangential velocity of the sealing surfaces is lower than the transport velocity of the film tube. The displacement movement can compensate this velocity difference. With rotary sealing jaws, a particularly long sealing time can be achieved. Preferably, the rotation velocity at which the sealing jaws are driven between two sealing processes, and the velocity of the displacement movement, are chosen such that a distance between successive transverse sealing seams on the film tube corresponds to a desired pack length. In particular, the rotation velocity between the sealing processes can be increased. This adaptation of the rotation velocity between sealing processes in order to achieve the desired pack length is known to the person skilled in the art as "limping". Preferably, the limping can be split among the sealing movement and the displacement movement. Acceleration peaks of the drive of the sealing movement and/or of the drive movement can be reduced. Further configurations of a transverse sealing unit which appear sensible to the person skilled in the art are also conceivable. In particular, at least two independent sealing drives can be provided to drive at least two sealing jaw pairs independently of one another. The respectively two sealing jaws of each sealing jaw pair can rotate about two common sealing axes of the sealing jaw pairs. In particular, a plurality of sealing shafts having independent sealing drives can be arranged concentrically to the two sealing axes and respectively support a sealing jaw of the sealing jaw pairs. While one sealing jaw pair performs a sealing process, the further sealing jaw pair or pairs can be driven at a velocity varying from the sealing jaw pair and/or, while one sealing jaw pair is sealing, execute a limping movement. Accelerations necessary for the limping movement can be lower. During the sealing process, the sealing jaws can be braked to a particularly low velocity. Particularly long sealing times can be achieved. Particularly advantageously, the transverse sealing unit can support the sealing jaws on crank mechanisms in a D-shaped sealing movement. During a straight section of the D-shaped sealing movement, the sealing jaws can be moved in the transport direction jointly with the film tube. The sealing surfaces can touch the film tube along a straight section of the sealing movement. Sealing times can be extended further. It is likewise possible for one or more sealing axes of sealing shafts to be mounted displaceably in a direction perpendicular to the transport direction.

In addition, a horizontal tubular bag machine comprising a horizontal transverse sealing station is proposed. The horizontal tubular bag machine can have particularly long sealing times. A pack quality can be particularly high. Packaging materials which require high sealing times can be processed at high velocity. Alternatively, with the same sealing time, higher velocities can be achieved.

The horizontal transverse sealing station according to the invention is here not intended to be limited to the application and embodiment which have been described above. In particular, in order to implement a working method which is described herein, the horizontal transverse sealing station according to the invention can have a number which varies from a herein stated number of individual elements, components and units.

BRIEF DESCRIPTION OF THE DRAWINGS

Further advantages emerge from the following drawing description. In the drawing, two illustrative embodiments of the invention are represented. The drawing, the description and the claims contain numerous features in combination. The person skilled in the art will expediently also view the features individually and put them together into sensible further combinations.

DETAILED DESCRIPTION

Figure 1:
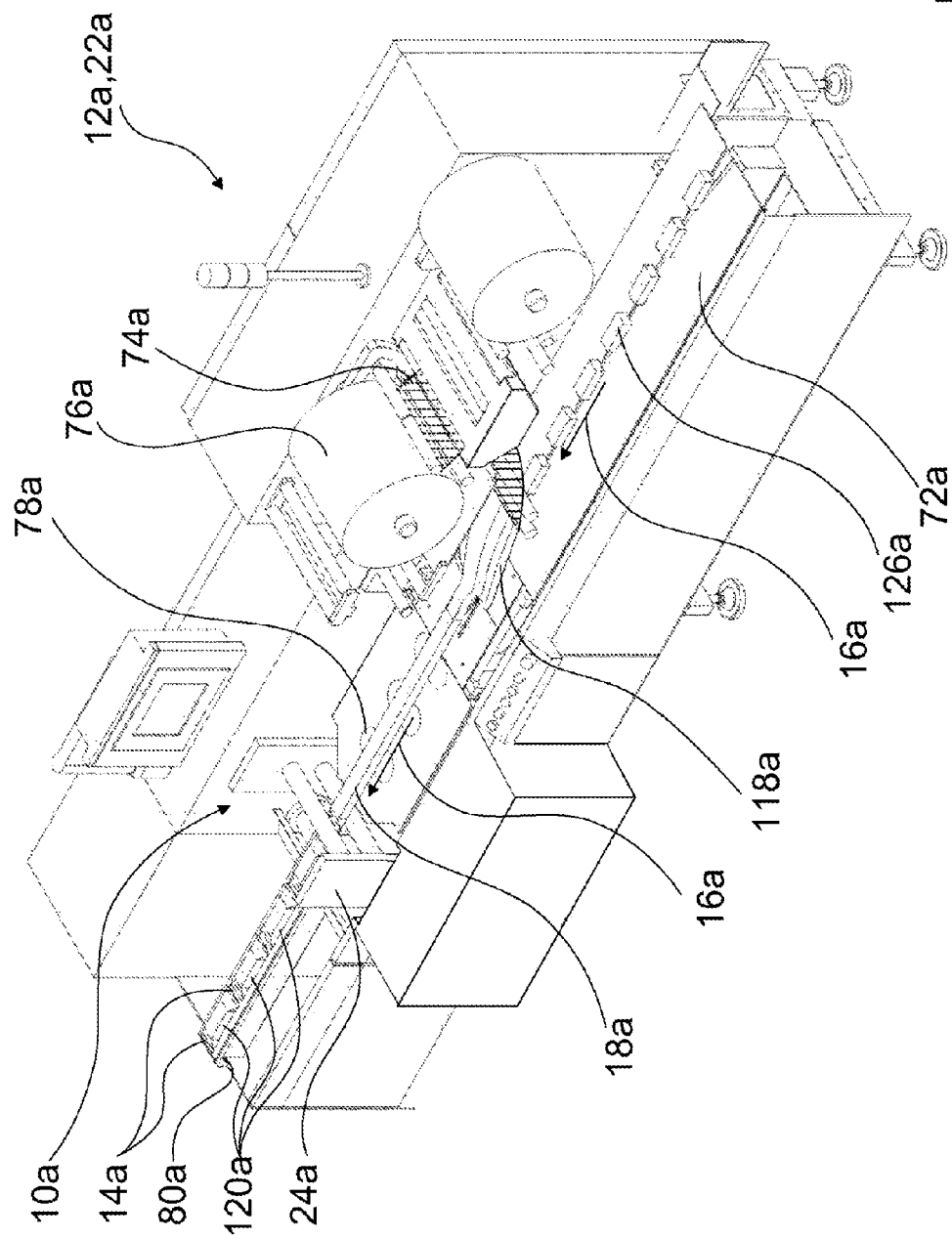
FIG. 1 shows a schematic representation of a packaging machine having a horizontal transverse sealing station comprising a transverse sealing unit displaceable on a transverse sealing station base.

FIG. 1 shows a packaging machine 22a configured as a horizontal tubular bag machine 12a and comprising a horizontal transverse sealing station 10a. Products to be packed 126a are guided in single track on a feed tray 72a in a horizontal transport direction 16a, by means of dogs (not represented in detail here) of a feed chain, to the horizontal transverse sealing station 10a. A material web 74a is unrolled from a packaging material roller 76a and formed with the aid of a forming shoulder 118a (not indicated here), around the products to be packed 126a, into a film tube 18a. The film tube 18a is transported continuously in the horizontal transport direction 16a and sealed below the products 126a by a horizontal longitudinal sealing unit 78a along a longitudinal sealing seam. Subsequently, the horizontal transverse sealing station 10a seals the film tube 18a along transverse sealing seams 14a and thus forms sealed packs 120a containing the products 126a. The horizontal transverse sealing station 10a here respectively forms at the same time a (in the transport direction 16a) first transverse sealing seam 14a of a (in the transport direction 16a) first pack 120a, and a (in the transport direction 16a) second transverse sealing seam 14a of a (in the transport direction 16a) second pack 120a. At the same time, the horizontal transverse sealing station 10a separates the film tube 18a by means of a crushing blade 82a arranged in the middle of the sealing surfaces 30a of a sealing jaw pair 28a (FIG. 2), so that this pack 120a is sealed with two transverse sealing seams 14a and is transported out of the tubular bag machine 12a on a discharge conveyor 80a.

Figure 2:
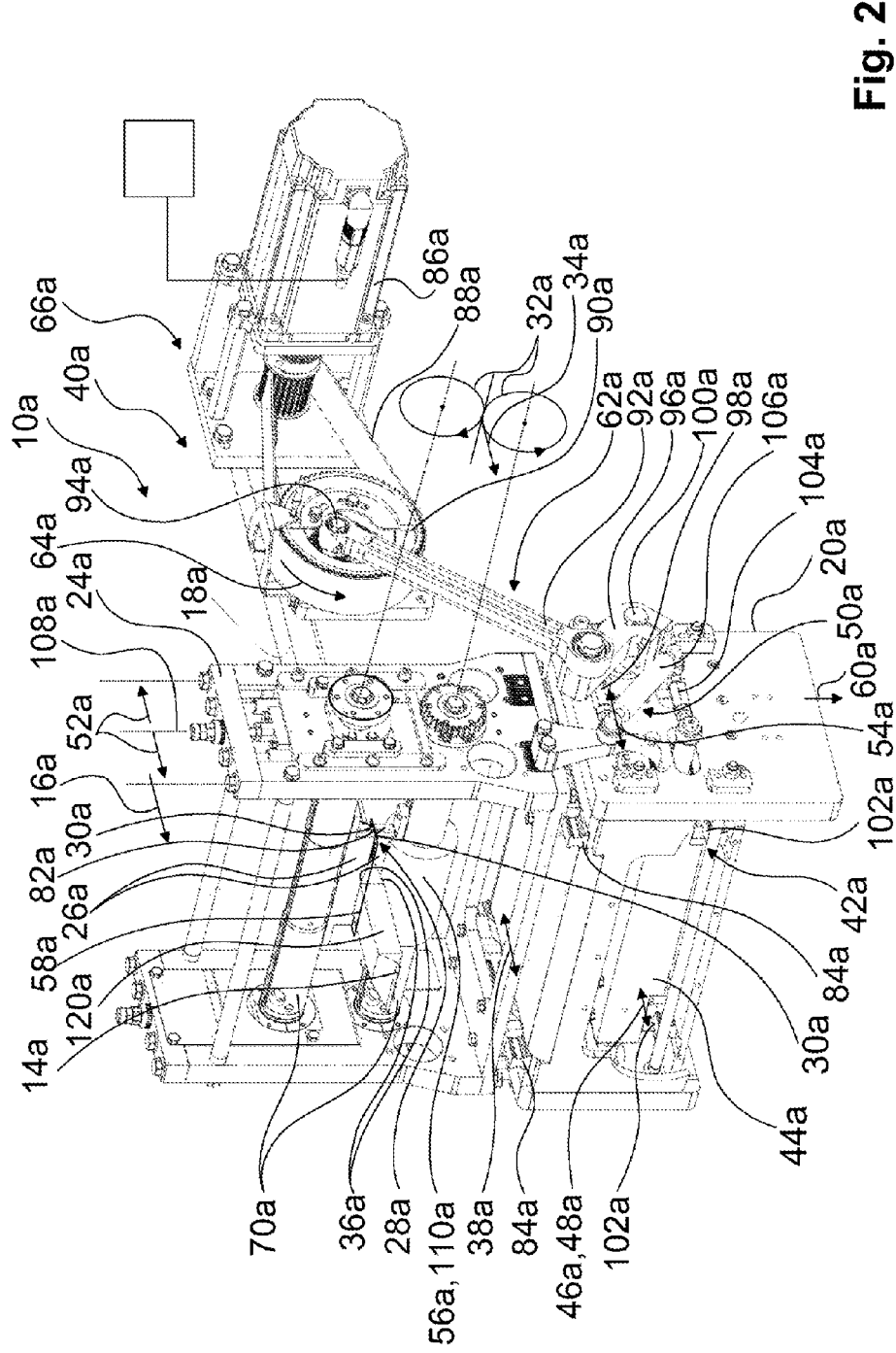
FIG. 2 shows a schematic representation of the horizontal transverse sealing station.

FIG. 2 shows a view of the horizontal transverse sealing station 10a. A transverse sealing station base 20a is fixedly connected to the tubular bag machine 12a. In the direction counter to a weight force 60a, above the transverse sealing station base 20a a transverse sealing unit 24a is drivably mounted on two linear guides 84a, fixedly connected to the transverse sealing station base 20a, in a displacement movement 38a parallel to the transport direction 16a.

The transverse sealing unit 24a has two rotatably mounted sealing shafts 70a, on which a sealing jaw 26a of the sealing jaw pair 28a is respectively disposed. The sealing shafts 70a are arranged one above the other in the direction of the weight force 60a such that one of the sealing jaws 26a is situated above and one below the film tube 18a. The sealing shafts 70a are driven via a linkage (not represented in detail here) synchronously by a sealing drive (likewise not represented in detail here). The sealing jaws 26a respectively execute circular sealing movements 32a about sealing axes of the sealing shafts 70a, in which movements the sealing surfaces 30a of the sealing jaw pairs 28a come closer together in order to seal material layers 36a of the film tube 18a between the sealing surfaces 30a, under the application of heat and pressure, and at the end of the sealing process move apart again. During the sealing process, the sealing movement 32a corresponds to an unrolling of the two sealing surfaces 30a on both sides of the film tube 18a. The sealing movement 32a has a movement component 34a in the transport direction 16a. In the region of the closest convergence of the sealing jaw pair 28a, in which the sealing surfaces 30a lie opposite each other, the velocity of the sealing movement 32a is parallel to the transport direction 16a and corresponds to a tangential velocity of the sealing surfaces 30a.

A drive and control unit 40a is provided to drive the transverse sealing unit 24a in the displacement movement 38a during the sealing process such that the sealing surfaces 30a of the sealing jaws 26a move in the transport direction 16a at least substantially synchronously to the film tube 18a. Without the displacement movement 38a, in order to achieve a synchronism between sealing surfaces 30a and film tube 18a, the movement component 34a in the transport direction 16a of the sealing surfaces 30a during the sealing process must correspond to a velocity in which the film tube 18a is moved in the transport direction 16a. Otherwise, the film tube 18a would be stretched and/or compressed and/or damaged. In the rotary sealing movement 32a during the sealing process, the sealing shafts 70a must be driven at an angular velocity such that the tangential velocity of the sealing surfaces 30a corresponds to the velocity of the film tube 18a in the transport direction 16a. In particular at high velocities of the film tube 18a, this leads to high angular velocities of the sealing shafts 70a, and thus to very short contact times of the sealing surfaces 30a with the film tube 18a and short sealing times. As a result of the displacement movement 38a, the sealing shafts 70a can be driven during the sealing process at a lower angular velocity. The movement component 34a in the transport direction 16a has a lower velocity than the movement of the film tube 18a in the transport direction 16a. A velocity difference is compensated during the sealing process by the displacement movement 38a. The thereby enabled lower angular velocity of the sealing shafts 70a during the sealing process leads to a longer contact time of the sealing surfaces 30a with the film tube 18a and longer sealing times. In particular, the sealing time can be adjusted, within the limits defined, in particular, by a maximum deflection 52a, a maximum acceleration and a maximum velocity of the displacement movement 38a, independently of the velocity of the film tube 18a in the transport direction 16a. The sealing time is here defined by the contact time of the sealing surfaces 30a with the film tube 18a, and thus by the angular velocity of the sealing shafts 70a during the sealing process. A velocity difference between the resulting tangential velocity of the sealing surfaces 30a and the velocity of the film tube 18a in the transport direction 16a is compensated by the displacement movement 38a. Between the individual sealing processes, the angular velocity of the sealing shafts 70a and/or the velocity of the displacement movement 38a is/are controlled in a limping movement such that a spacing of the produced transverse sealing seams 14a on the film tube 18a corresponds to a desired pack length.

The drive and control unit 40a has a crank mechanism 62a, which is designed to generate the displacement movement 38a from a drive movement 64a of a displacement drive 66a of the transverse sealing unit 24a. The displacement drive 66a has a servo motor 86a, which, via a toothed belt 88a, drives a drive wheel 90a. A crank 92a is disposed on an eccentric 94a of the drive wheel 90a and transmits the drive movement 64a to a lever 96a articulately coupled to the transverse sealing station base 20a at a coupling point 100a. The lever 96a drives the transverse sealing unit 24a, via a push rod 98a, cyclically in the displacement movement 38a.

In addition, in the transverse sealing station base 20a is arranged a mass compensating unit 42a comprising a drivably mounted compensating mass 44a, which is driven, in a compensation movement 46a having a movement component 48a parallel to the displacement movement 38a, such that the inertial forces induced by the displacement movement 38a and those induced by the compensation movement 46a are partially eliminated. The compensating mass 44a is mounted with two linear guides 102a on the transverse sealing station base 20a and is driven by a push rod 104 disposed on a side, lying opposite the coupling point 100a, of the lever 96a. The compensating mass 44a thus moves in a compensation movement 46a in counter direction to the displacement movement 38a of the transverse sealing unit 24a. The compensating mass 44a has a mass corresponding to the mass of the transverse sealing unit 24a. The inertial forces induced by the displacement movement 38a and the compensation movement 46a are therefore eliminated, except for a torque resulting from the distance of the center of mass of the compensating mass 44a from the center of mass of the transverse sealing unit 24a perpendicular to the displacement movement 38a. Alternatively, the compensating mass 44a can have a mass varying from the transverse sealing unit 24a, and the leverages of the lever 96a can be adapted such that the inertial forces induced by the displacement movement 38a, once again except for the torque resulting from the distance of the center of mass of the compensating mass 44a from the center of mass of the transverse sealing unit 24a perpendicular to the displacement movement 38a, are eliminated. In order to achieve this, the leverage must be chosen such that the velocities and the masses of the compensating mass 44a and of the transverse sealing unit 24a are inversely proportional to one another. The torque is relayed via the transverse sealing station base 20a to the tube bag machine 12a and diverted via feet of the tube bag machine 12a to a machine foundation.

In addition, an energy storage unit 50a is provided to apply to the transverse sealing unit 24a a restoring force 54a opposite to the deflection 52a of the displacement movement 38a. The energy storage unit 50a has a spring element 106a, which is arranged between the transverse sealing unit 24a and the compensating mass 44a. In a neutral position 108a with a zero deflection 52a, the spring element 106a is slackened and exerts no restoring force 54a. In the neutral position 108a, the transverse sealing unit 24a and the compensating mass 44a are arranged centrically, in the direction of the displacement movement 38a and of the compensation movement 46a, relative to a maximum path of the displacement movement 38a and of the compensation movement 46a. If the transverse sealing unit 24a is moved in the displacement movement 38a and the compensating mass 44a is moved in the opposite compensation movement 46a, the spring element 106a is lengthened or shortened in dependence on a motional direction and exerts between the transverse sealing unit 24a and the compensating mass 44a a tensile or a compressive force having a force component which produces a restoring force 54a. The restoring force 54a becomes larger with increasing deflection 52a. At the turning point of the eccentric 94a of the crank mechanism 62a, at which the deflection 52a is greatest, the restoring force 54a has the greatest magnitude. At the turning point, the velocity of the transverse sealing unit 24a in the direction of the displacement movement 38a amounts briefly to zero. The restoring force 54a produces at the turning point a particularly high acceleration of the transverse sealing unit 24*a*, so that the velocity rapidly increases. A dynamic of the drive and control unit 40*a*, and thus of the movement of the transverse sealing unit 24*a* in the displacement movement 38*a*, is substantially improved by the energy storage unit 50*a*. Higher velocities can be achieved, or a less expensive drive can be used in combination with the same velocities.

In addition, a supporting unit 56*a* is provided to support the film tube 18*a* in a sealing region 58*a* of the transverse sealing unit 24*a*, before and/or after the sealing process, against the weight force 60*a*. The sealing region 58*a* is here that region of the transverse sealing unit 24*a* in which the sealing surfaces 30*a* of the sealing jaw pair 28*a* come closer together and enter into contact with the film tube 18*a*. The supporting unit 56*a* is formed by a cylinder 110*a*, which is disposed on the, in the direction of the weight force 60*a*, lower sealing shaft 70*a*, and which extends around the lower sealing shaft 70*a* and is penetrated by the sealing jaw 26*a* of the lower sealing shaft 70*a*. The cylinder 110*a* has about the sealing axis of the lower sealing shaft 70*a* a radius which is reduced by half the pack height of the packs 120*a*, measured in the direction of the weight force 60*a*, compared to the radius of the sealing surfaces 30*a* about the sealing axis. Between the sealing processes, the film tube 18*a* enveloping the products rests on the supporting unit 56*a*, so that sagging of the film tube 18*a* in the sealing region 58*a* is avoided and, on a discharge side, the packs 120*a* cannot fall downward before resting on the discharge conveyor 80*a*.

The following description and the drawing of a further illustrative embodiment are substantially confined to the differences between the illustrative embodiments, wherein, in respect of identically labeled components, in particular in respect of components having identical reference symbols, reference can basically be made also to the drawings and/or the description of the other illustrative embodiment. In order to differentiate between the illustrative embodiments, in place of the letter a of the first illustrative embodiment the letter b is suffixed to the reference symbols of the further illustrative embodiment.

Figure 3:
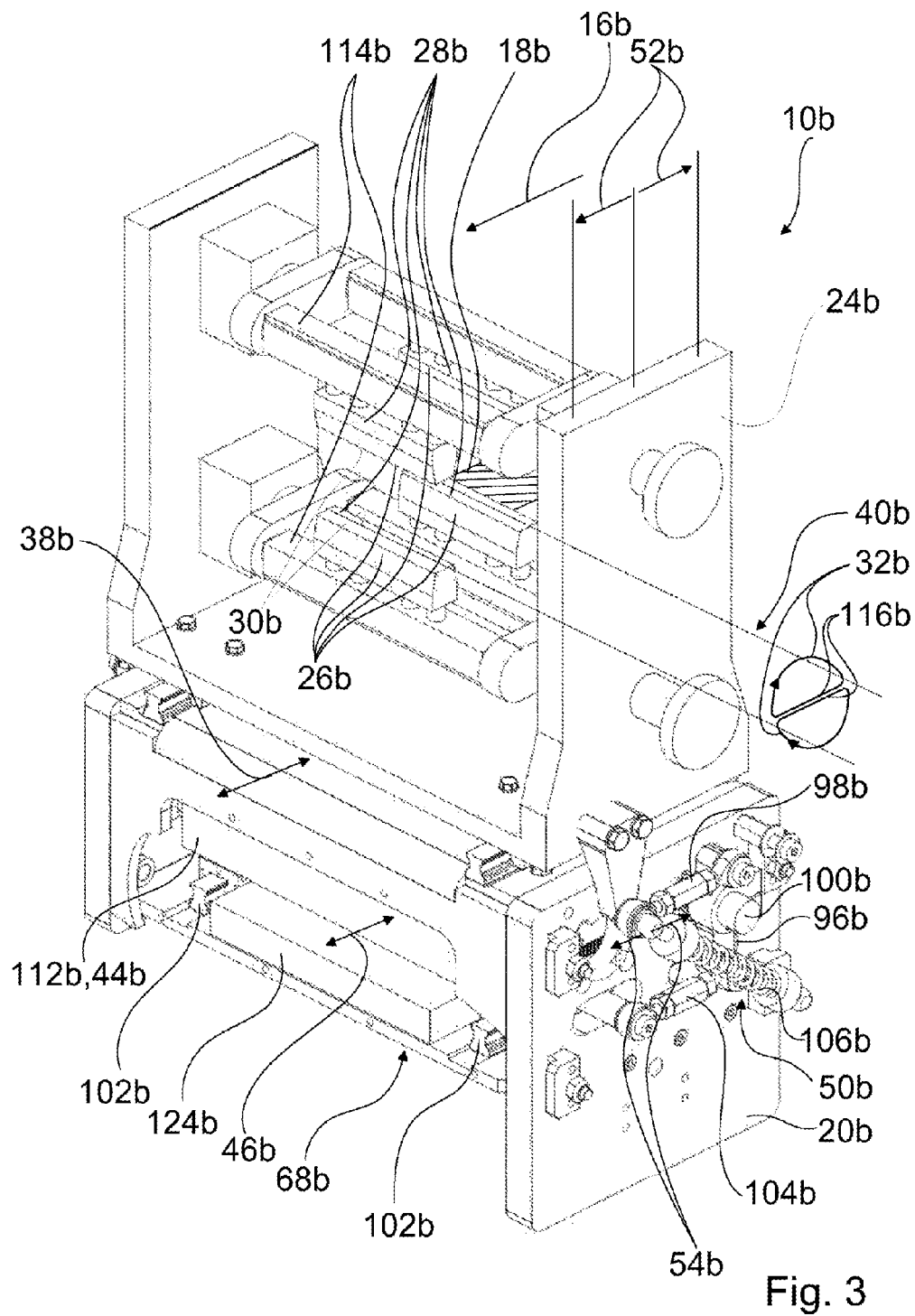
FIG. 3 shows a schematic representation of a horizontal transverse sealing station comprising a transverse sealing unit displaceable on a transverse sealing station base, in a second illustrative embodiment.

FIG. 3 shows a view of a horizontal transverse sealing station 10*b* in a second illustrative embodiment. The horizontal transverse sealing station 10*b* differs from the horizontal transverse sealing station 10*a* of the first illustrative embodiment in particular by the fact that a drive and/or control unit 40*b* has a linear drive 68*b*, which is designed to generate a displacement movement 38*b*. The linear drive 68*b* is arranged in a transverse sealing station base 20*b* on two linear guides 102*b* in accordance with the compensating mass 44*a* of the transverse sealing station base 20*a* of the first illustrative embodiment. A secondary part 112*b* of the linear drive 68*b* at the same time forms a compensating mass 44*b*. A primary part 124*b* of the linear drive 68*b* is fixedly disposed on the transverse sealing station base 20*b*, so that a feeding of electric power to the moved part of the linear drive 68*b* is dispensed with. Alternatively, it is possible for a primary part of a linear drive to be moved and form a compensating mass. Via a lever 96*b*, which is arranged at a coupling point 100*b*, and two push rods 98*b*, 104*b*, the linear drive 68*b* drives a transverse sealing unit 24*b* in the displacement movement 38*b*. The linear drive 68*b* here moves, in a compensation movement 46*b*, opposite to the displacement movement 38*b*. Inertial forces induced by the displacement movement 38*b* and the compensation movement 46*b* are eliminated, as in the first illustrative embodiment, except for a remaining torque. An energy storage unit 50*b* has a spring element 106*b*, which is arranged between the transverse sealing unit 24*b* and the transverse sealing station base 20*b* and, in dependence on a deflection 52*b* of the transverse sealing unit 24*b* in the direction of the displacement movement 38*b*, applies a restoring force 54*b* to the transverse sealing unit. In this illustrative embodiment, the drive and/or control unit 40*b* generates the displacement movement 38*b* independently of a sealing movement. A velocity profile of the displacement movement 38*b* can thereby easily be altered. The displacement movement can be adjusted such that a high flexibility is achieved. In particular, a sealing movement 32*b* and the sealing time can be optimally adjusted for a material of a film tube 18*b*. The velocity difference of the sealing movement 32*b* during the sealing process relative to the velocity of the film tube 18*b* in the transport direction 16*b* is compensated by the displacement movement 38*b*. If the velocity of the sealing movement 32*b* is higher than the velocity of the film tube 18*b* in the transport direction 16*b*, the displacement movement 38*b* during the sealing process is made counter to the transport direction 16*b*.

In addition, the horizontal transverse sealing station 10*b* differs from the horizontal transverse sealing station 10*a* of the first illustrative embodiment in particular by the fact that respectively two sealing jaws 26*b* are arranged in the transport direction 16*b*, in accordance with a desired pack length, one behind the other on respectively two mutually opposing D-motion crank mechanisms 114*b*, wherein mutually opposing sealing jaws 26*b* respectively form a sealing jaw pair 28*b*. The D-motion crank mechanisms 114*b* have kinematics which lead to a D-shaped sealing movement 32*b* of the sealing jaws 26*b*, wherein the straight section of the "D" extends along the transport direction 16*b* along a sealing section 116*b*, during which the sealing jaws 26*b* are in contact with the film tube 18*b*. Such D-motion crank mechanisms 114*b* are known to the person skilled in the art and produce a prolonged sealing time, since sealing surfaces 30*b* of the sealing jaws 26*b* can move over the sealing section 116*b* synchronously to the film tube 18*b*. An achievable maximum length of the sealing section 116*b* is limited however, since a dynamic of the D-motion crank mechanism 114*b*, if designed for a large sealing section 116*b*, becomes increasingly worse. As a result of the additional displacement movement 38*b*, a part of the path covered by the film tube 18*b* in the transport direction 16*b* can be compensated by the displacement movement 38*b*, and the sealing section 116*b* can be shortened relative to the transverse sealing unit 24*b*. Through the combination of the transverse sealing unit 24*b* with the D-motion crank mechanism 114*b* and the additional displacement movement 38*b*, the horizontal transverse sealing station 10*b* has a higher efficiency and can achieve longer sealing times, as well as higher film tube velocities in the transport direction 16*b*, and thus higher outputs. In addition, a supporting unit (not represented in detail here) is provided to prevent sagging of the film tube 18*b* and/or of packs (likewise not represented here) before and after the transverse sealing unit 24*b*. The supporting unit is formed by strip edges moved in the transport direction 16*b* synchronously with the sealing jaws 26*b*. A distance between the strip edges and the sealing jaws 26*b* is here always small enough that the film tube 18*b* and/or the packs do not inadmissibly sag. Supporting units of this type are known to the person skilled in the art.

What is claimed is:

1. A horizontal transverse sealing station for a horizontal tubular bag machine (12*a*; 12*b*), for producing transverse sealing seams (14*a*; 14*b*) on at least one film tube (18*a*; 18*b*) transported in a continuous, at least substantially horizontal transport direction (16*a*; 16*b*), the horizontal transverse sealing station comprising a transverse sealing station base (20a; 20b), which is fixedly connected to the tubular bag machine (22a; 22b), the transverse sealing station base (20a, 20b) including a transverse sealing unit (24a; 24b) having at least one sealing jaw pair (28a; 28b), which is movably mounted on the transverse sealing unit (24a; 24b) and is formed by two sealing jaws (26a; 26b) and the sealing surfaces (30a; 30b) of which, during a sealing process, come closer together in a sealing movement (32a; 32b) having relative to the transverse sealing unit (24a; 24b) at least one movement component (34a; 34b) in the transport direction (16a; 16b), in order to seal material layers (36a; 36b) of the film tube (18a; 18b) between the sealing surfaces (30a; 30b), under the application of at least one of heat and pressure, and to move said material surfaces apart again at the end of the sealing process, wherein the transverse sealing station base (20a, 20b) also includes a mass compensating unit (42a, 42b) having at least one drivably mounted compensating mass (44a, 44b), characterized in that the transverse sealing unit (24a; 24b) is mounted drivably on the transverse sealing station base (20a; 20b) with a displacement movement (38a; 38b) at least substantially parallel to the transport direction (16a; 16b), wherein the at least one drivably mounted compensating mass (44a, 44b), which, in a compensation movement (46a, 46b) comprises at least one movement component (48a, 48b) that is parallel to the displacement movement (38a, 38b) and is driven such that the inertial forces induced by the displacement movement (38a, 38b) and those induced by the compensation movement (46a, 46b) are at least partially eliminated.

2. The horizontal transverse sealing station as claimed in claim 1, characterized by a drive and/or control unit (40a; 40b), which is configured to drive the transverse sealing unit (24a; 24b) in the displacement movement (38a; 38b) during the sealing process such that a velocity difference of the sealing movement (32a; 32b) and of the film tube (18a; 18b) in the transport direction (16a; 16b) is at least substantially compensated.

3. The horizontal transverse sealing station as claimed in claim 1, characterized by an energy storage unit (50a; 50b), which is configured to apply a restoring force (54a; 54b), opposite to a deflection (52a; 52b) of the displacement movement (38a; 38b), to the transverse sealing unit (24a; 24b).

4. The horizontal transverse sealing station as claimed in claim 1, characterized by a supporting unit (56a), which is configured to support the film tube (18a) in a sealing region (58a) of the transverse sealing unit (24a), before and/or after the sealing process, against a weight force (60a).

5. The horizontal transverse sealing station as claimed in claim 1, characterized by a crank mechanism (62a), which is configured to generate the displacement movement (38a) from a rotary drive movement (64a) of a displacement drive (66a).

6. The horizontal transverse sealing station as claimed in claim 1, characterized by a linear drive (68b), which is configured to generate the displacement movement (38b).

7. The horizontal transverse sealing station as claimed in claim 1, characterized in that the sealing jaws (26a) are mounted on sealing shafts (70a) mounted rotatably on the transverse sealing unit (24a).

8. The horizontal transverse sealing station as claimed in claim 1, characterized in that the sealing jaws (26b) are mounted on crank mechanism (114b) mounted on the transverse sealing unit (24b).

9. A horizontal tubular bag machine (12a; 12b) comprising a horizontal transverse sealing station (10a, 10b) as claimed in claim 1.

* * * * *